Aug. 20, 1968    E. SIMPSON, JR    3,397,502
COMPOSITE TRUSS STRUCTURE
Filed Nov. 10, 1966
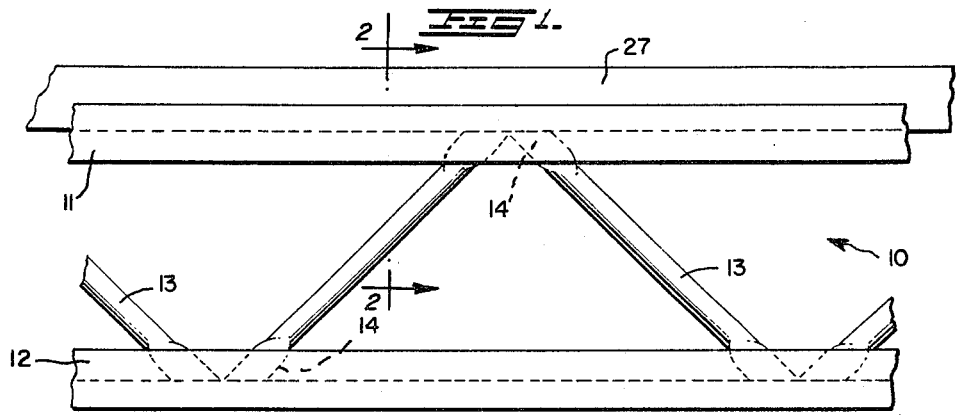
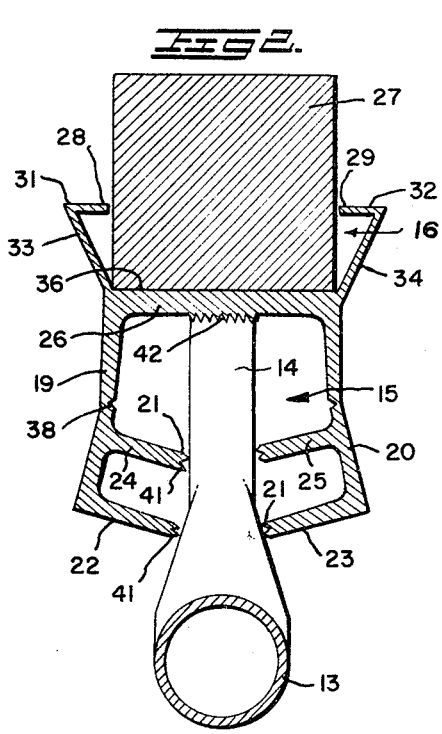
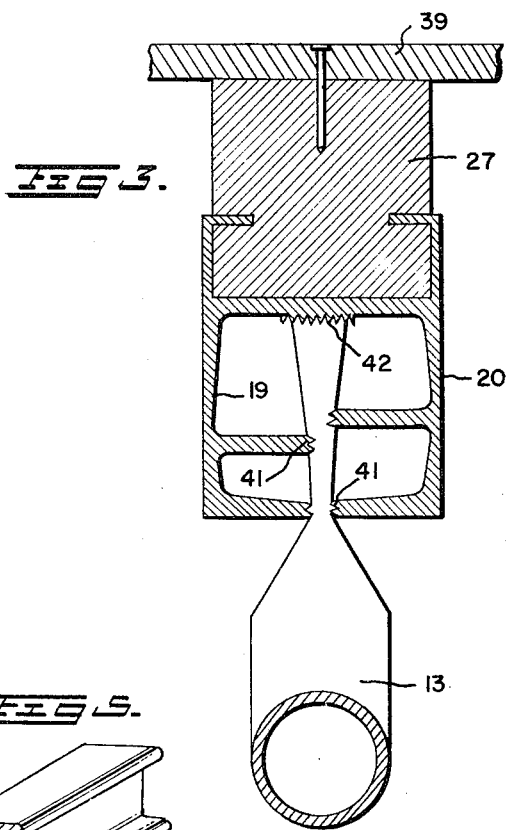
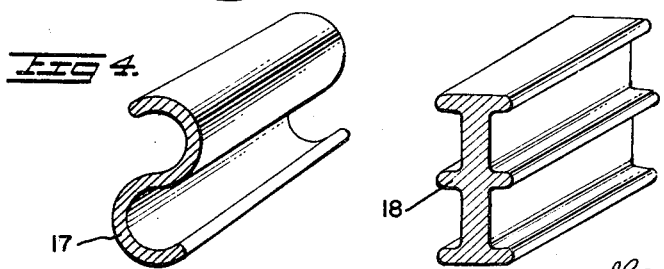
INVENTOR
ERIC SIMPSON, JR.
BY Glenn, Palmer, Matthews & Pyne
ATTORNEYS United States Patent Office 3,397,502
Patented Aug. 20, 1968

3,397,502
COMPOSITE TRUSS STRUCTURE
Eric Simpson, Jr., Henrico County, Va., assignor to Reynolds Metals Company, Richmond, Va., a corporation of Delaware
Filed Nov. 10, 1966, Ser. No. 593,571
6 Claims. (Cl. 52—693)

ABSTRACT OF THE DISCLOSURE

This invention discloses a composite truss structure comprising top and bottom metal chord members having oppositely facing channels. Web elements or bracing members are disposed in and between one set of oppositely facing channel members of the top and bottom metal chord members while a secondary nailable element is disposed in at least one of the other oppositely facing channel elements for attachment of the composite truss structure to a desired fixed structural element of a building, for example.

---

This invention relates to composite structural units and more particularly to extrusion members adapted to unite several elements into a single structural unit.

The joining of several structural elements into a singular unit is broadly practiced in the construction arts. For instance, trusses are built by uniting a pair of chord members with a web or lattice-like formation between them by bolting and/or welding together the several elements at a number of points along their lengths.

In accordance with the present invention metal extrusions, such as aluminum extrusions, may be pre-assembled in a shop where press means are readily available and then sent to the job site where they can be assembled rapidly. Thus no laborious and expensive welding operation is required at the job site in order to secure together the chord and web members of the composite truss assembly.

In a preferred form of the present invention a metal extrusion member is formed with oppositely directed channels or troughs which are adapted to receive and securely grip portions of secondary structural elements disposed therein when the side walls of the channels or troughs are pressed inwardly. Gripping members are provided which extend laterally inwardly from the walls of the channel and, with the aid of serrated or toothed formations at the free ends thereof, are thereby able to hold the secondary structural elements tightly in place. Thus the composite truss structure of this invention may be formed without the aid of welding or nut and bolt assemblies.

The inherent advantages and improvements of the present invention will become more readily apparent upon considering the following detailed description of the invention and by reference to the drawings in which:

FIGURE 1 shows a loosely assembled composite truss structure incorporating at least one metal extrusion chord member embodying the instant invention;

FIGURE 2 is a transverse section, in larger scale, taken at 2—2 in FIGURE 1;

FIGURE 3 is a transverse section, similar to that of FIGURE 2 but with the side walls of the chord member pressed inwardly into permanent gripping engagement with the secondary structural elements; and FIGURES 4 and 5 show transverse sections of some web elements, other than the tubular element shown in FIGURES 1 through 3 which may be used in the composite structure.

With further reference to the drawings, the composite truss structure 10 comprises a pair of chord members 11, 12 with a series of web or lattice elements 13 extending angularly from one chord member to the other with end portions 14 of the web members projecting into channels 15 of the chord members. While the chord members 11, 12 are shown to be parallel, they need not necessarily be so and could be a portion of an A-frame, for example.

One or both of the chord members 11, 12 is provided with a trough 16 facing in the opposite direction to that of channel 15 and adapted to receive another secondary structural element, as hereinafter more fully described.

The web element 13, may, of course, be a continuous zigzag element with its lateral or angularly bent portions inserted in the channels; or, instead of being tubular as shown in FIGURES 1, 2 and 3, the element may have another cross-sectional formation, such as that of one of those shown at 17 and 18 (FIGURES 4 and 5), in which instance the end portions 14 would not need to be modified for insertion in the channel 15. In fact, the web element 13 may take any suitable form and may include corrugated sheet.

In FIGURE 2, the somewhat flattened end 14 of a tubular web element 13 is disposed between side walls 19 and 20 of the channel 15 and is interposed between inner free ends 21 of a pair of outer jaws 22, 23, and of a pair of inner jaws 24, 25. The outer jaws extend inwardly from outer ends of the side walls 19, 20 while the inner jaws project inwardly from the side walls, intermediate the outer jaws and the bottom wall 26 of the channel.

Another secondary structural element, such as a rail or wooden nailing strip 27, may be inserted in the trough 16 between the free ends 28, 29 of jaws 31, 32, which project inwardly from the outer ends of the side walls 33, 34 of the trough 16, and rest on the bottom wall 36 of the trough 16.

The bottom walls of the channel and trough are shown as a common wall comprising a single transverse web in the extrusion element 11 but, obviously, they may be separate transverse webs and/or be of differing widths consistent with the respective widths of the channel and trough which may, when desired, vary in width one from the other.

The transverse spacing between each pair of jaws 22 and 23, 24 and 25, 31 and 32, in the original extrusion member 11 (FIGURE 2) is, of course, predetermined and dependent upon the thickness of that portion of the secondary element (i.e. 13 and 27), to be inserted between the jaws. The spacing is initially slightly greater than the thickness of the element.

Furthermore, the channel walls 19, 20 and trough walls 33, 34 preferably diverge or flare outwardly from their respective bottom walls 26, 36, and the side walls may, if desired, be slightly weakened along a longitudinal line or area 38 intermediate its bottom wall and outer end for a purpose to be described hereinafter.

With the secondary elements 13 and 27 assembled in channel 15 and trough 16, respectively, as shown in FIGURES 1 and 2, the channel side walls 19 and 20, and trough side walls 33 and 34 are pressed and deformed inwardly to substantially parallel relationship (FIGURE 3), so that, the jaws 22, 23, 24 and 25 of the channel, and the jaws 31 and 32 of the trough are forced inwardly to bite into and securely grip the secondary elements disposed therebetween as shown in FIGURE 3. In this connection, deforming pressure of the flared lower portions of the channel walls 19, 20 causes the same to pivot bout the line 38 in clamping the web, and results in the walls 19, 20 becoming substantially parallel.

Each jaw of a pair may be offset from the other, such as jaws 24 and 25 (FIGURES 2 and 3) and the inner ends of one or more of the jaws may be provided with serrations or teeth 41 to enhance their grip on the secondary element.

Furthermore, the bottom wall of the channel and/or trough may be provided with teeth or serrations 42 with which an innermost portion of the secondary element can engage to further improve the grip of the extrusion member 11 on the secondary element when the side walls of the extrusion member are pressed inwardly.

When the truss structure 10 is ultimately assembled as part of a building framework, a wooden flooring 39 may be nailed thereto (FIGURE 3). Alternatively, the wooden nailing strip 27 in top chord 11 may be nailed to a ceiling of a building framework or a wooden nailing strip (not shown) may be disposed in a chord 12 and nailed to a floor structure.

While it is preferred to form the chord members 11 and 12 from aluminum extrustions, it is possible that these chord members may be formed from magnesium, steel, titanium or other metals.

It is thought that the invention and many of its attendant advantages will be clearly understood from the foregoing description, and it is obvious that various changes may be made in the construction and arrangement of the elements without departing from the nature and spirit of the invention.

What is claimed is:

1. In a complete truss structure, the combination of
   (a) a metal chord member comprising a pair of spaced lateral walls, and
   (b) a transverse wall between and uniting said lateral walls intermediate their ends thereby forming a channel on one side and a trough on the other side of said transverse wall;
   (c) a web element having a portion thereof disposed within said channel;
   (d) at least the central portion of said transverse wall in said channel being provided with teeth for engagement with the innermost portion of said web element;
   (e) inwardly projecting jaws on the lateral walls of said channel securely engaging opposite sides of said portion of said web element;
   (f) a secondary structural element disposed within said trough; and
   (g) inwardly projecting jaws on the lateral walls of said trough securely engaging opposite sides of said secondary structural element;
   (h) whereby said chord member, web element and secondary structural element are secured in a unitary structure.

2. In a complete truss structure, the combination of
   (a) a metal chord member formed from an aluminum extrusion comprising a pair of straight lateral walls, and
   (b) a transverse wall between and uniting said lateral walls intermediate their ends thereby forming a channel on one side and a trough on the other side of said transverse wall;
   (c) a web element having a portion thereof disposed within said channel;
   (d) a plurality of pairs of gripping members extending laterally inwardly from the walls of said channel securely engaging opposite sides of said portion of said web element;
   (e) a secondary structural element disposed within said trough;
   (f) a pair of gripping members extending laterally inwardly from the walls of said trough securely engaging opposite sides of said secondary structural element;
   (g) said gripping members having inner faces provided with teeth for biting into and gripping the opposite sides of said web element and said secondary structural element;
   (h) whereby said chord member, web element and secondary structural element are secured in a unitary structure.

3. A truss structure as set forth in claim 2 wherein said web element is a hollow tubular member and wherein mating members of a pair of gripping elements which extend laterally inwardly from the walls of said channel are offset vertically with respect to each other.

4. A truss structure as defined in claim 2 wherein said web element is a hollow tubular member and wherein the mating members in the outermost pair of gripping members which extend laterally inwardly from the walls of said channel are in line and the mating members in an inner pair of gripping members which extend laterally inwardly from the walls of said channel are offset vertically with respect to each other.

5. A truss structure as defined in claim 2 wherein at least the central portion of said transverse wall in said channel is provided with teeth for engaging the innermost portion of said web element.

6. A truss structure as defined in claim 2 wherein the walls of said channel are provided with a longitudinally extending weakened area, said walls of said channel between said longitudinally weakened area and the free ends thereof diverge outwardly prior to the disposition of said web element in said channel whereby said side walls of said channel may be pivoted about said longitudinal weakened area into substantially parallel relationship in order to hold said web element securely.

References Cited
UNITED STATES PATENTS

| | | | |
|---|---|---|---|
| 1,101,189 | 6/1914 | Kahn et al. | 52—694 |
| 1,602,283 | 10/1926 | Noble et al. | 52—693 |
| 1,621,299 | 3/1927 | White | 52—693 |
| 1,824,076 | 9/1931 | Dale | 52—694 |
| 1,837,706 | 12/1931 | Ferguson | 52—694 |
| 1,951,810 | 3/1934 | Schaffert | 52—376 |
| 2,031,765 | 2/1936 | Ferguson | 52—694 |
| 2,082,159 | 6/1937 | Hansen | 52—376 |
| 2,377,427 | 6/1945 | Kessler | 52—664 |
| 3,129,493 | 4/1964 | Grubb | 52—694 |

FRANCIS K. ZUGEL, *Primary Examiner.*